Patented July 3, 1934

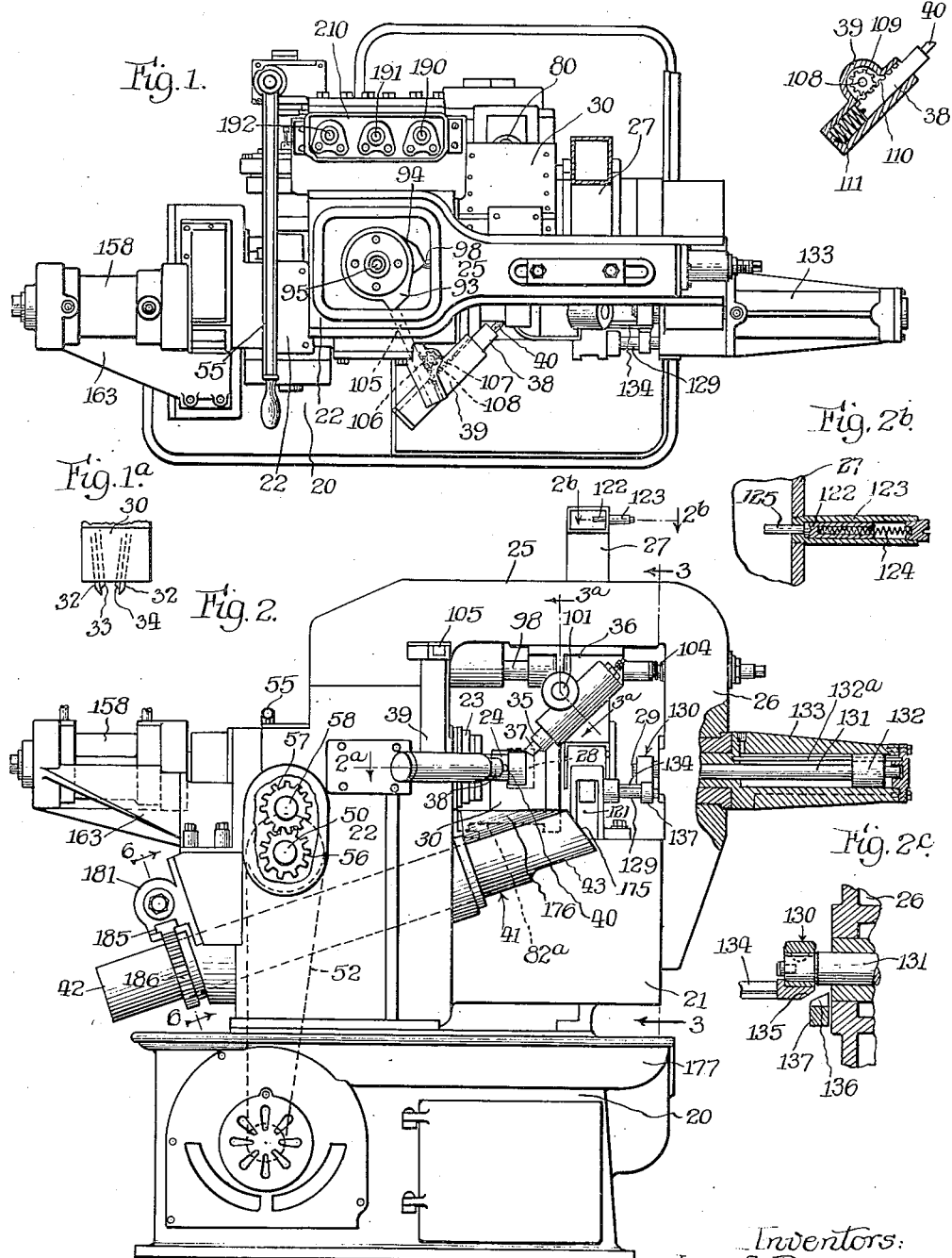

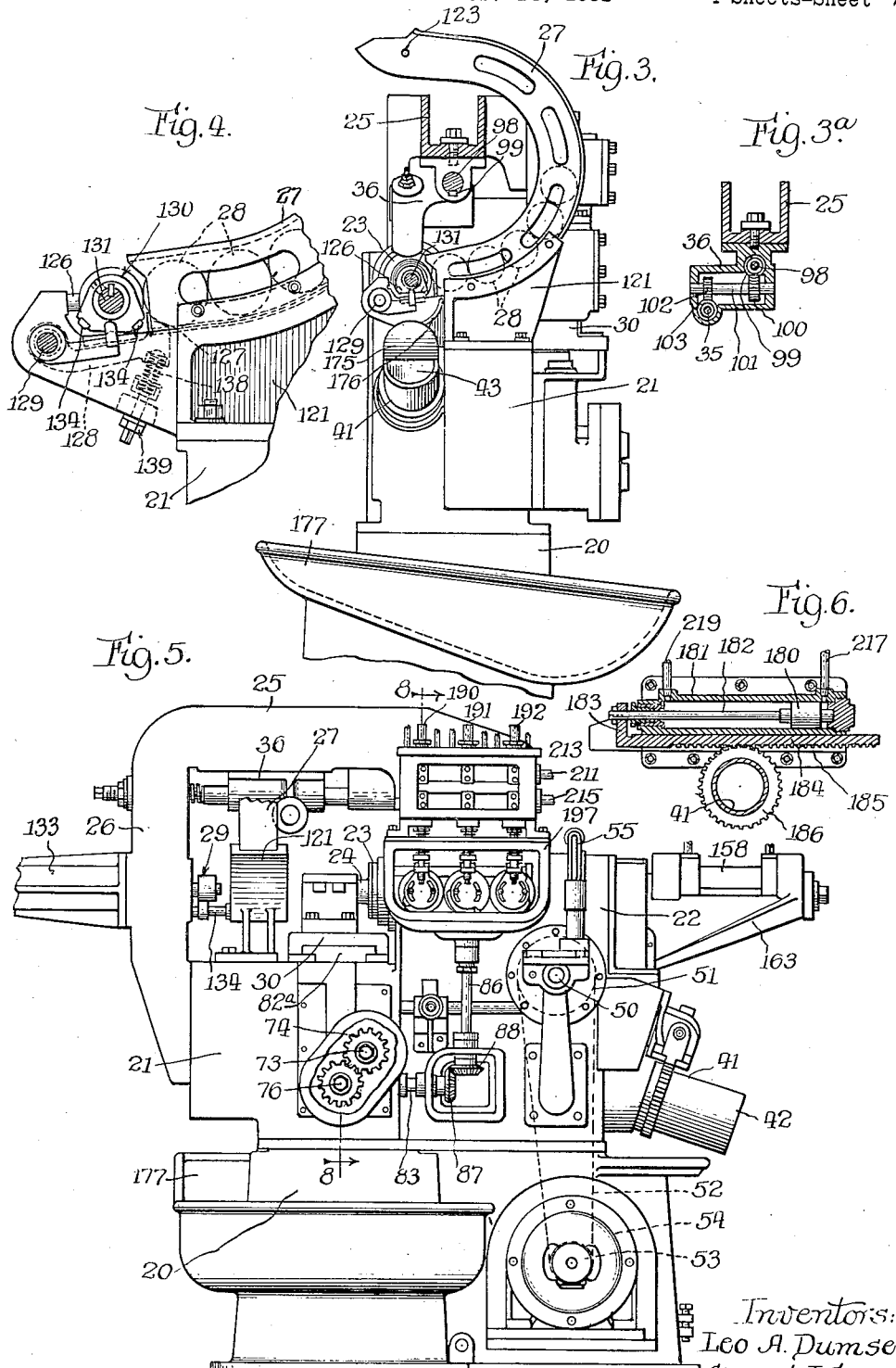

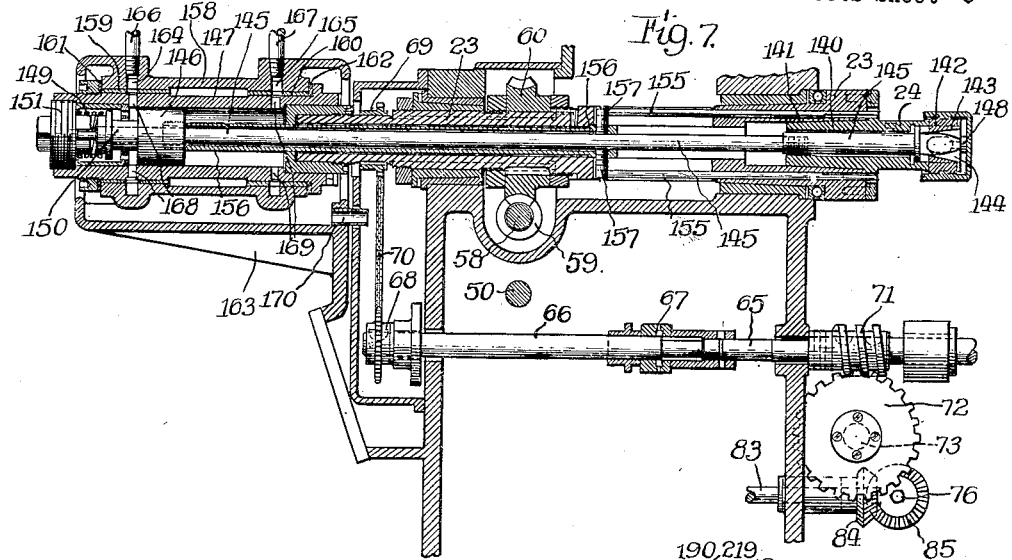

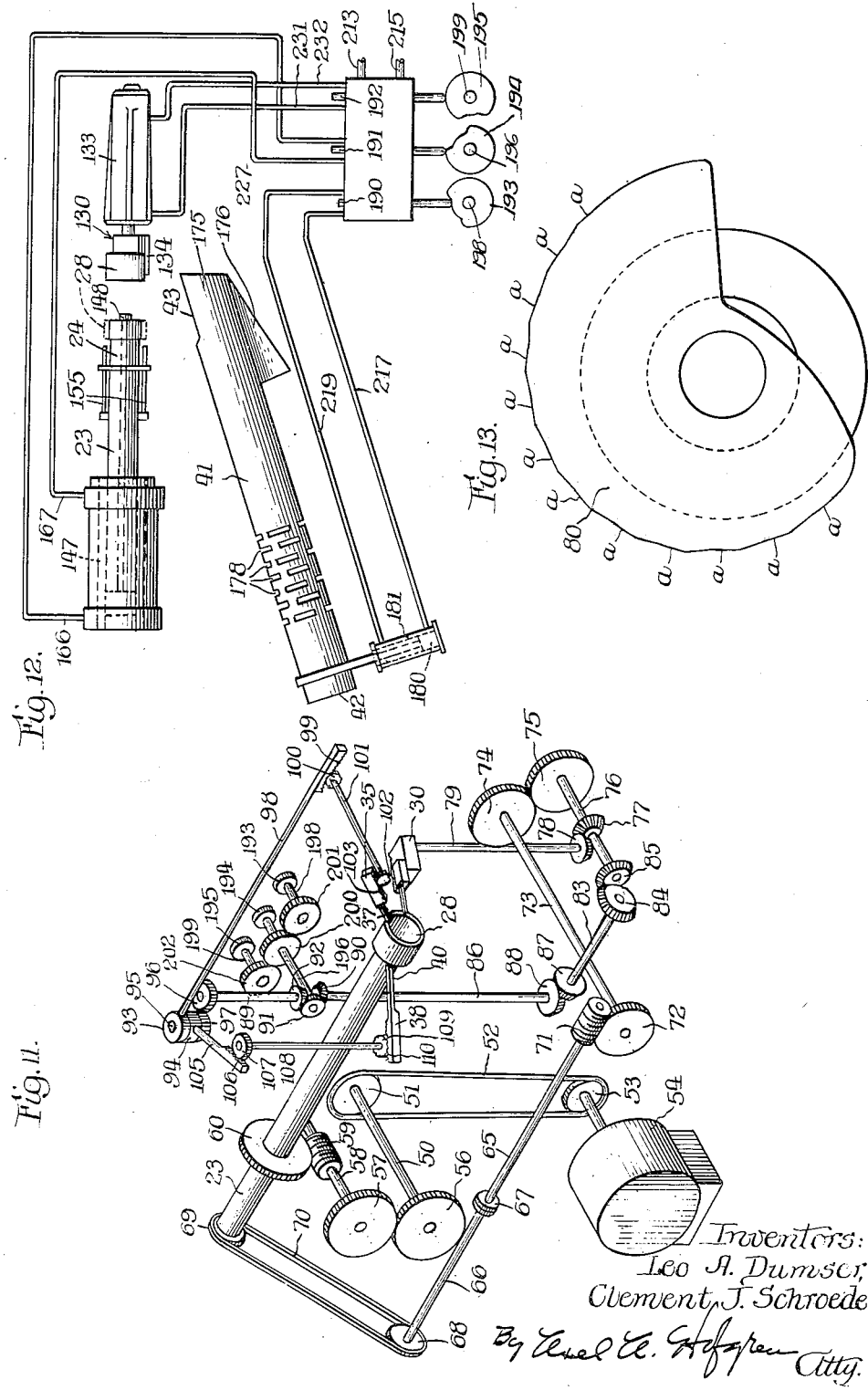

1,964,937

UNITED STATES PATENT OFFICE 1,964,937

MACHINE TOOL

Leo A. Dumser and Clement J. Schroeder, Rockford, Ill., assignors to Sundstrand Machine Tool Co., Rockford, Ill., a corporation of Illinois Application February 14, 1931, Serial No. 515,777

20 Claims. (Cl. 82—2)

The invention relates generally to machine tools and more particularly to an automatic machine wherein work pieces or blanks are chucked, finished and ejected automatically.

The general object of the invention is to provide a new and improved machine tool embodying a work holder together with automatic means for loading a work piece onto the holder, for finishing the work piece while so mounted and for removing the finished work piece.

Another object of the invention is to provide a new and improved automatic lathe of this character wherein the work pieces, placed in a hopper by an operator, are then chucked, finished and ejected automatically without any further attention on the part of the operator.

Another object is to provide in such an automatic machine a novel means for receiving the finished work pieces.

Another object is to provide, in combination with a machine tool cutting means, means for feeding the cutting means so as to produce chips which are cut into short lengths so that they may be easily handled.

Other objects and advantages of the invention will become apparent from the following detailed description taken in connection with the accompanying drawings, in which:

Fig. 1 is a plan view of a lathe embodying the preferred form of the invention.

Fig. 1a is a fragmentary plan view of the rear tool slide.

Fig. 2 is a front elevation, partly in section, of the machine illustrated in Fig. 1.

Fig. 2a is a fragmentary section along the line 2ª—2ª of Fig. 2.

Fig. 2b is an enlarged section along the line 2ᵇ—2ᵇ of Fig. 2.

Fig. 2c is an enlarged fragmentary sectional view of a portion of the work transferring means.

Fig. 3 is a fragmentary elevational view taken from the right hand end of Fig. 2 and partly in section along the line 3—3 of Fig. 2.

Fig. 3a is a section along the line 3ª—3ª of Fig. 2.

Fig. 4 is an enlarged fragmentary view of a portion of the mechanism illustrated in Fig. 3.

Fig. 5 is a rear elevational view of the machine illustrated in Figs. 1 to 4.

Fig. 6 is a section approximately along the line 6—6 of Fig. 2.

Fig. 7 is a fragmentary vertical section through the headstock spindle.

Fig. 8 is a fragmentary end view with certain parts removed and partly in section approximately along the line 8—8 of Fig. 5.

Fig. 9 is an enlarged view of the cam-operated valve mechanism shown in Fig. 5.

Fig. 10 is an end view of Fig. 9, partly in section approximately along the line 10—10 of Fig. 9.

Fig. 11 is a somewhat diagrammatic view of the gearing.

Fig. 12 is a diagrammatic view of the hydraulic circuit.

Fig. 13 is an enlarged view of one of the tool holder actuating cams.

Although the invention is disclosed herein in its preferred form as embodied in a lathe particularly adapted for handling cup-shaped blanks which are finished for use as bearing races for anti-friction bearings, it is to be understood that this disclosure is to be considered as an exemplification of the principles of the invention and is not intended to limit the invention to the embodiment illustrated. The scope of the invention will be pointed out in the appended claims.

In pursuance of the foregoing objects of the invention, an exemplary form illustrated and described herein, is incorporated in an automatic lathe and embodies means for supporting a plurality of work pieces or blanks, a rotatably mounted work holder, means for loading blanks onto said work holder from said supporting means, a plurality of tools for finishing said blanks, means for supporting and actuating said tools to finish said blanks, means for ejecting the finished work pieces from the work holder, and means for receiving the finished work pieces.

As illustrated in the drawings, the invention, in the form chosen for purposes of disclosure, is embodied in a lathe having a base 20 (Figs. 1 to 3, and 5), a bed 21 on said base, a headstock 22 formed integrally with said bed and extending upwardly from the left-hand end thereof (Fig. 2), a spindle 23 (Figs. 2 and 7) rotatably mounted in said headstock and carrying a mandrel or work holder 24 and an overarm or supporting member 25 secured to the upper end of the headstock and extending parallel to the bed 21 and having a downwardly depending portion 26 secured to the end of the bed. A hopper or chute 27 is provided for supporting a plurality of work pieces or blanks 28 and a loading or transferring means, designated generally as 29, is adapted to transfer the work pieces one by one from the lower end of said chute to the work holder 24.

In the form disclosed herein, which as mentioned hereinbefore, is particularly adapted for manufacturing races for ball bearings out of cup-shaped blanks, a plurality of tool holders and tools are preferably provided so that a plurality of operations may be performed with a single chucking of the blanks. A rear tool slide 30 is mounted on the bed 21 for movement transversely of the bed and is adapted to carry tools 32 (Fig. 1a) for cutting off the ends of the work pieces and tools 33 and 34 for chamfering the outside edges thereof. A tool holder 35 slidably mounted in a bracket 36 secured to the overarm 25 is adapted to carry a tool 37 for chamfering the inside of one end of the work piece. A tool holder 38 slidably mounted in a bracket 39 secured to the headstock 22 is adapted to carry a tool 40 for chamfering the inside of the opposite end of the work piece. Means, as hereinafter more fully described, is provided for ejecting the finished work pieces from the mandrel and into a receiving means herein shown comprising a tube 41 mounted on an inclined axis so that the work pieces move downward by gravity to the discharge end 42 thereof. This tube is preferably arranged to be oscillated 180 degrees from the position shown in Figs. 2 and 3 to the position shown in Fig. 12 so as to admit the finished work pieces through a side opening 43, but is arranged to be positioned as shown in Figs. 2 and 3 during the cutting operations so as to prevent chips from falling therein.

In the preferred form of the invention, as disclosed herein, the spindle 23 and the tool supports are arranged to be actuated mechanically by means of gearing, illustrated diagrammatically in Fig. 11, and the loading means, chucking means, ejecting means and receiving means are arranged to be operated by means of pressure fluid actuated devices as illustrated diagrammatically in Fig. 12.

The mechanical drive to the spindle comprises a main drive shaft 50 extending transversely through the headstock and carrying a pulley 51 adjacent its rear end adapted to be connected by means of a belt 52 to the drive pulley 53 of a motor 54 positioned in the base 20. A main clutch (not shown) is preferably provided intermediate the pulley 51 and the drive shaft 50 and is operable by means including a control lever 55 having its handle portion (Fig. 1) extending to the front of the machine. On the front end of the drive shaft 50 is mounted a pick-off gear 56 which meshes with a corresponding pick-off gear 57 mounted on the forward end of the parallel shaft 58. This shaft carries a worm 59 (Fig. 7) which meshes with a worm wheel 60 secured to the spindle 23.

The tool supports are preferably driven from the spindle. As illustrated herein the means for driving the tool supports includes a feed shaft 65 (Figs. 7 and 11), extending longitudinally of the bed and connected to the spindle by means of a coaxial shaft 66, a clutch device 67 intermediate said shafts, sprockets 68 and 69 on the shaft 66 and spindle 23, respectively, and a chain 70 intermediate said sprockets. The feed shaft 65 has a worm 71 secured thereto which meshes with a worm wheel 72 secured to the forward end of a transversely extending shaft 73. On the rear end of said shaft 73 is mounted a pick-off gear 74 (Figs. 5, 8 and 11) which meshes with a corresponding pick-off gear 75 secured to the rear end of a parallel shaft 76. The rear tool slide is actuated from the shaft 76 by means of beveled gears 77 and 78, a vertically extending shaft 79, a cam 80 secured to the upper end of said shaft, and a follower 81 secured to the tool slide. A coiled spring 82 may be provided to co-operate with the peripheral type of cam shown for returning the tool slide, this spring being positioned intermediate the tool slide and a stationary block 82ᵃ (Fig. 8) secured to the bed 20.

The chamfering tool holders are also preferably driven from the shaft 76. These tool holders, as illustrated herein, are driven by means of a short horizontal shaft 83 (Figs. 5, 8 and 11) connected at one end to shaft 76 by means of beveled gears 84 and 85 and connected at its other end to a vertical shaft 86 by means of beveled gears 87 and 88. A coaxial vertical shaft 89 is positioned above the shaft 86 and connected thereto by means of beveled gears 90, 91, 92. Cams 93 and 94 are mounted on a short vertical shaft 95 which is positioned adjacent the upper end of shaft 89 and driven by means of gears 96 and 97 on the shafts 89 and 95. The tool holder 35 is actuated by the cam 93 by means of a reciprocatory follower 98 slidably mounted in the overarm 25 and bracket 36 and having a rack 99 (Figs. 3a and 11) thereon engaging a pinion 100 rotatably mounted on a shaft 101 in said bracket. A second pinion 102 on said shaft engages a rack 103 secured to the tool holder 35. Preferably, a coil spring 104 is secured intermediate the follower 98 and an abutment on the depending portion 26 of the overarm 25 when a peripheral type cam is used, for the purpose of withdrawing the tool holder (Fig. 2).

The tool holder 38 is arranged to be actuated by the cam 94 by means of a reciprocatory follower 105 slidably mounted in a slot in the overarm as shown in Figs. 1 and 2. The follower 105 has a rack 106 thereon engaging a pinion 107 secured to the upper end of a vertically disposed shaft 108 mounted in the bracket 39. This shaft has a second pinion 109 (Figs. 2a and 11) on its lower end which engages a rack 110 secured to the tool holder 38. This tool holder is also preferably arranged to be returned by means of a spring 111 secured at one end to the tool holder and at its other end to the bracket 39. In the exemplary form of the invention the cams 80, 93 and 94, which actuate the tool supports are preferably of the form illustrated so as to cause an advance movement of the tool holders and thereafter to permit their return movement during continued operation of the feed shaft in one direction.

The means for supporting a plurality of work pieces or blanks is illustrated in the drawings (Figs. 1 to 5) as comprising a hopper or chute 27, arcuate in form, positioned with its lower or discharge end alined with and adjacent the work holder 24 and supported on a frame 121 mounted on the bed 21. The lowermost blank may therefore be transferred to the work holder by means operable to shift the blank axially. The chute is arranged so that the blanks 28 may be loaded into the top thereof and move by gravity downwardly.

As mentioned hereinbefore, the exemplary embodiment of the invention is particularly adapted for use with cup-shaped work pieces which are arranged to be loaded onto an expanding chuck. To insure proper positioning of the work pieces in the chute, means is preferably provided which prevents an operator from inserting a work piece incorrectly. For use with work pieces of the character illustrated herein, this means (Figs. 2 and 2b) comprises a spring pressed pin 122 positioned on the right-hand side of the chute 27 and slidably mounted in a tube 123 secured to the chute. A coiled spring 124 is arranged to urge the pin so that one end 125 thereof projects into the chute. In order to move a work piece past this pin it is necessary that the work piece be positioned with the rounded or closed end to the right so that the rounded end of the work piece cams or pushes the pin back as the piece moves by.

At the lower end of the chute 27 an abutment 126 is provided (Figs. 3 and 4), arranged to aline the lowermost blank 28 with the work holder 24. When the loading means, which will be more fully described hereinafter, operates to move the lowermost work piece onto the work holder, the remainder of the work pieces in the chute are held back by means including a stop member 127 which is mounted on the free end of a pivotally mounted arm 128. This stop member, when in the position illustrated in Fig. 4, prevents the remainder of the work pieces from dropping down against the abutment 126 while the loading means is transferring the lowermost work piece to the work holder. The arm 128 is pivotally mounted by means of a shaft 129 (Figs. 1 to 4) rotatably mounted on the frame 121.

The means for transferring or loading the work pieces onto the work holder 24 is herein disclosed as comprising (Figs. 2, 3, 4 and 12) a carrier 130 which is movable longitudinally of the work holder axis and is supported on one end of a piston rod 131, the other end of which is secured to a piston 132 slidably mounted in a horizontal cylinder 133 secured to the depending portion 26 of the overarm. The carrier has a pair of supporting pins or members 134 which are arranged to slip under the lowermost work piece in the chute 27 as shown most clearly in Fig. 4, so that when the carrier is moved toward the work holder 24 by means of the piston 132 the pins slide under and pick up the lowermost work piece from the chute and transfer it to the work holder. A rod 132ª passes through a bore in the piston and is mounted in the cylinder ends so as to prevent the piston from turning in the cylinder.

The transferring means is preferably provided with means operable during the return stroke of the carrier to pivot the arm 128 so as to lower the stop member 127 and permit the next work piece to roll down into engagement with the abutment 126. This means is herein illustrated as comprising a beveled cam surface 135 (Fig. 2c) on the carrier 130 which is adapted to engage a correspondingly beveled surface 136 on an arm 137 secured to a projecting end of the pivot shaft 129, and thereby lower the arm 128 when the carrier is in its withdrawn position. This movement of the arm 128 withdraws the stop member 127 which is then held in its withdrawn position until the carrier is again moved toward the work holder at which time the stop member 127 is returned to its raised position by means of a coiled spring 138 (Fig. 4) positioned intermediate the free end of the arm 128 and an adjusting device 139 mounted on the supporting frame for the chute.

The workholder 24 is herein shown in the form of a chuck or mandrel having a tapered shank 140 (Fig. 7) which is mounted in a tapered bore 141 in the spindle 23 and comprises a plurality of radially movable jaws 142 which have beveled inner edges 143 so that they may be operated simultaneously by means of a conical member 144 secured to an operating rod 145. When the rod 145 is moved toward the left (Fig. 7) the jaws 142 are moved outwardly into clamping engagement with the tubular portion of the work piece. In the preferred form of the invention a piston 146 is slidably mounted on the rod 145 and in a cylinder 147 which is secured to the left hand end of the spindle 23 and rotates therewith.

During the operation of the loading means in placing a work piece on the work holder the jaws 142 are given an initial outward movement when the end wall of the work piece engages a projection or abutment 148 on the end of the jaw operating member 144. This moves the rod 145 towards the left at the same time that it moves the jaws outwardly, and compresses a spring 149 which is positioned intermediate a collar 150 on the left-hand end of the rod 145 and the end wall 151 of the cylinder 147. Further clamping of the work piece is preferably accomplished by means of a fluid under pressure moving the piston 146 against the collar 150.

The means for ejecting finished work pieces from the work holder is herein shown as mounted on the spindle 23 (Fig. 7) for operation by means of the piston 146. This means comprises a pair of longitudinally extending rods or pins 155 slidably mounted in bores in the spindle 23 and positioned so that when moved towards the right (Fig. 7) the rods engage the tubular portion of the work piece to move it off the work holder. At their other ends these pins 144 are secured to a tubular sleeve 156, which is slidably mounted on the rod 145, by means of a pair of radially extending members 157. The piston 146 is secured to the left-hand end of the sleeve 156 so that when the piston is moved towards the left during the clamping operation the ejecting pins are withdrawn into the spindle as shown in Fig. 7. Upon completion of the cutting operations on the work piece movement of the piston 146 towards the right not only permits the spring 149 to release the chuck jaws but, by means of the sleeve 156, actuates the ejecting pins 155 to remove the finished work piece from the work holder.

In order to supply pressure fluid to the cylinder 147 the cylinder is rotatably mounted in a stationary casing 158 (Figs. 1, 2 and 7) by means of sleeve bearings 159 and 160 and thrust collars 161 and 162. The casing 158 is supported on the headstock by means of a bracket 163 and is provided with a pair of annular recesses 164 and 165 which also extend through the sleeve bearings. The recess 164 is connected to a conduit 166 (Figs. 7 and 12) and the recess 165 is connected to a conduit 167. The cylinder 147 is provided with a plurality of radial ports 168 at one end establishing communication between the recess 164 and that end of the cylinder and is provided with radial ports 169 at the other end establishing communication between the recess 165 and that end of the cylinder. Pressure fluid admitted through the conduit 167 at the right-hand end of the cylinder is adapted to withdraw the ejecting pins and move the piston toward the left into engagement with the collar 148 on the rod and thereby hold the work piece on the work holder. Pressure fluid admitted through the conduit 166 acts to move the piston 146 toward the right, thereby permitting the spring 149 to release the jaws 142, and causing the ejecting pins 155 to eject the finished work piece from the workholder. The conduits 166 and 167 lead to the control valve mechanism, as described more fully hereinafter. The casing 158 is preferably provided with a drain 170 leading into the headstock of the machine.

In its exemplary form the means for receiving the finished work pieces when they are ejected from the work holder 24 comprises the tubular member 41 which is rotatably mounted in the bed of the machine on an inclined axis (Fig. 1). This member has an end wall 175 at its upper end, the opening 43 into which the finished work pieces are discharged by the ejecting means being formed in the side. In the position illustrated in Fig. 2 the member 41 is inverted so that the chips do not enter the receiving means but fall on the tube and are deflected into the base of the machine. A shield 176 is preferably secured to the outside of the tube 41 opposite the opening 43 so that when it is in its inverted position said shield engages the forward portion of the rear tool slide 30. Thus, when the tubular member is rotated 180 degrees in a counter clockwise direction (Fig. 3) the shield 176 carries along the chips hanging on the tool slide and efficiently clears them away and discharges them into a chip pan 177 on the base. A plurality of openings 178 (Fig. 12) are preferably provided in the tube 41 for the purpose of draining off any cutter coolant that may enter the receiver 41.

The receiving means is adapted to be oscillated by means including a piston 180 (Fig. 6) which is slidably mounted in a cylinder 181 (Figs. 2 and 6), secured to the headstock end of the machine. As illustrated most clearly in Fig. 6, a piston rod 182, secured to the piston, extends out through a bore in the left-hand end of the cylinder 181 and is connected to an arm 183 which is carried on one end of a rack 184. This rack is slidably mounted on ways 185 (Figs. 2 and 6) and engages an annular gear 186 secured to the tube. The stroke of the piston and the gearing are so proportioned that the tubular member 41 will be oscillated through approximately 180 degrees by a reciprocation of the piston.

The means for controlling the fluid for operating the loading, chucking, ejecting and receiving means is herein disclosed as comprising valves 190, 191 and 192 (Figs. 1, 5, 9, 10 and 12) which are arranged to be actuated by means of cams 193, 194 and 195, respectively. These cams are preferably driven from the tool holder feeding mechanism, and as illustrated most clearly in Figs. 8, 9 and 10, a transversely extending shaft 196 on which the beveled gear 91 is mounted is positioned in a casing 197 which contains said cams, and serves to drive the cams. The cams 193 and 195 are mounted on short shafts 198 and 199 which are parallel to the shaft 196 and are driven therefrom by means of gears 200, 201 and 202. The valves are provided with downwardly projecting portions which enter the forward portion of the casing 197 and are adapted to be actuated by the cams by means of arms 203, 204 and 205 which are pivotally mounted at 206. Follower members 207 are secured to said arms intermediate their ends for engaging said cams and adjustable screw devices 208 are mounted in the ends of the arms for engaging the valve stems. The valves are normally held in their lowermost positions by means of springs 209.

The valves 190, 191 and 192 may all be of the form illustrated in Fig. 8, wherein the valve 190 is shown mounted in a vertical bore 210 in a valve casing 211, which casing is provided with an inlet chamber 212 adapted to be connected to a pressure fluid supply by means of a connection 213, and an exhaust chamber 214 adapted to be connected to the return pipe of the fluid supply by means of a connection 215. A passage 216 in the casing communicates at one end with the exhaust chamber 214 and at its other end is connected to one end of the cylinder 181 by means of a conduit 217. A second passage 218 is similarly connected at one end to the exhaust chamber 214 and at its other end is connected to the other end of the cylinder 181 by a conduit 219. A port 220 is provided intermediate the supply chamber 212 and the passage 218 and a second port 221 is provided intermediate the supply chamber 212 and the passage 216.

The valve 190 is positioned in the vertical bore 210 and extends through the passages 216 and 218, and ports 220 and 221, as illustrated in Fig. 8, so as to control the flow of pressure fluid to and from the cylinder 181. The valve is herein shown as having a pair of longitudinally spaced annular grooves 222 and 223, which serve to open the ports and passages with which they are alined. Thus, with the valve in its uppermost position, as illustrated, pressure fluid is admitted from the supply chamber 212 to the passage 216 through the port 221, and port 220 is closed. Similarly connection is established between passage 218 and the exhaust chamber 214, and passage 216 is closed to said exhaust chamber. When the valve is moved to its lowermost position the annular recesses 222 and 223 are arranged to coincide with port 220 and passage 216, reversing the direction of flow of fluid to the cylinder 181.

Valves 191 and 192 are similar in construction to the valve 190 just described and all three valves are operated in proper timed relation by means of the cams 193, 194 and 195. As illustrated diagrammatically in Fig. 12, valve 191 controls the flow of fluid through passages 225 and 226 and ports 225ª and 226ª (Fig. 9) which communicate by means of conduits 167 and 166 with the opposite ends of the cylinder 147, and valve 192 is arranged to control the flow of fluid through passages 229 and 230 and ports 229ª and 230ª which communicate by means of conduits 231 and 232 with the cylinder 133.

The cams 193, 194 and 195 which actuate the control valves are preferably adjustable in character so as to permit of changing the timing of the valves. As illustrated herein, the cams are formed by a pair of plates or disks 235 and 236 (Fig. 10) which are adjustable angularly with respect to each other, the forward plate 235 having arcuate slots 237 (Fig. 9) therein through which screw devices 238 extend into engagement with the rear plate 236. By adjusting one plate relatively to the other, the timing of the valves may be adjusted and the length of time which the valve remains in each of its positions may be varied.

The cams 80, 93 and 94 which are provided for actuating the tool supports are preferably provided with a plurality of dwell portions a as illustrated most clearly in Fig. 13 on cam 93, so that the feeding movements of the tools are somewhat intermittent. This permits the tools to clear the cut at frequent intervals so that the chips are relatively short and are prevented from curling and tangling in the machine. This type of construction enables the machine to operate continuously with relatively little attention and eliminates the necessity of having an operator spend a great deal of time disentangling chips from the tool supports and other parts of the machine.

The operation, assuming that the chute 120 contains work pieces, that the main motor 54 is in operation, that fluid under pressure is supplied to the hydraulic system, and that the parts are positioned with the tool supports and loading means retracted and the receiver down, is as follows:

The loading means operates when cam 195 lowers valve 192 and admits fluid to the right-hand end of cylinder 133, thereby placing a work piece on the mandrel 24. The jaws 142 are expanded into contact with the tubular portion of the work piece by the pressure exerted by the loading means against the abutment 148 on the rod 145. Thereafter the cam 194 raises valve 191 and admits fluid through the conduit 167 to the right-hand end of cylinder 147, thus moving the piston 146 toward the left further to clamp the work piece and retract the ejecting means. The loading means then returns when cam 195 raises the valve 192 and admits fluid to the left-hand end of the cylinder 133, the loading means in its fully retracted position actuating the arm 137 (Figs. 2c and 4) so as to lower the stop member 127 and permit the next work piece to roll down into engagement with the abutment 126.

The rear tools then advance, actuated by the cam 93, and after the cut-off tools 32 cut the work piece to the proper length, the right-hand tool 32 (Fig. 1a) cutting off the closed end of the blank, the chamfering tools 33 and 34 chamfer the outside of the ends of the work pieces and the chamfering tools 37 and 40 are advanced by the cams 93 and 94 to chamfer the inside of the ends of the work piece. Upon the completion of the cutting operations, the tools are returned and the receiving means is rotated when cam 193 lowers valve 190 and admits pressure fluid to the left-hand end of cylinder 181 (Fig. 6) to rotate the tube 41 and place the opening 43 uppermost, the deflecting means 176 during this movement removing the chips from the rear tool slide and dropping them into the chip pan 177. The chucking jaws are then released when cam 194 lowers valve 191 to admit fluid to the left-hand end of cylinder 147 through conduit 166, and by the movement of piston 147 toward the right the work piece is released from the chuck jaws and is ejected by means of the pins 155. As soon as the ejecting means has operated to discharge the finished work pieces into the receiver, the receiver is again rotated, this time in the opposite direction, to return it to the position illustrated in Figs. 2 and 3, and the machine is in readiness to start on the next cycle of operations.

It is believed apparent from the foregoing that we have provided an efficient and completely automatic machine for operating on work pieces or blanks, the only manual operation required being the initial starting of the machine and keeping the hopper or supply chute filled with work pieces. Extremely simple means have been provided for insuring the proper insertion of the work pieces in the supply chute, and the means for loading the work pieces onto the rotating mandrel, the means for chucking the work pieces, the tool supports and actuating means, the means for ejecting finished work pieces, and the means for receiving the finished work pieces combine to form a machine which is simple in construction, rapid and efficient in operation, and readily adjustable to operate on different types of work pieces. By providing a receiving means movably mounted so that in one position it is adapted to receive an ejected work piece, and which may be moved prior to the cutting operations so that chips can not fall therein, together with means for separating the cutter coolant from the finished work pieces, the completion of the work pieces and the removal thereof from the machine is greatly facilitated. Furthermore, by providing for periodical dwells in the movement of the tool supports during the cutting operation, the chips are broken up and are thereby in such condition that they may be readily removed from the working parts of the machine automatically.

We claim as our invention:

1. A machine comprising, in combination, means for supporting a plurality of work pieces, rotatably supported work holding means, means for transferring the pieces one by one from said supporting means to said work holding means, means for finishing the work pieces, means for ejecting finished work pieces from said work holding means, and means for receiving the ejected work pieces comprising a tubular member mounted on an inclined axis and having an aperture in one side through which the finished work pieces are admitted, and means for moving the tubular member to a position wherein chips cannot fall through said aperture during the finishing operations.

2. A machine tool having, in combination, a rotatably mounted spindle, a work holder mounted at one end of said spindle and comprising a plurality of movable jaws, means including a first member movable longitudinally of the spindle for actuating said jaws, an abutment on said member, a piston slidably mounted on the spindle adapted when moved in one direction to engage said abutment and actuate said member to clamp a work piece on said work holder, a second member slidably mounted on said spindle for movement longitudinally thereof for ejecting a finished work piece from said holder, and means connecting said second member to said piston so that when the piston moves in the opposite direction the work piece is released and ejected.

3. A machine tool having, in combination, a rotatably mounted spindle, a work holder mounted at one end of said spindle and comprising a plurality of radially movable jaws, means including an axially movable member for actuating said jaws, a collar on said member, a piston slidably mounted on said member adapted when moved in one direction to engage said collar and actuate said member to clamp a work piece to said jaws, resilient means for moving said member in the opposite direction to release the work piece, a plurality of rods slidably mounted in said spindle for movement longitudinally thereof, to eject a finished work piece from said holder, and a tubular member surrounding said axially movable member and connected at one end to said rods and at its other end to said piston.

4. A machine tool comprising, in combination, a bed, a headstock at one end of said bed, an overarm extending parallel to said bed from the upper end of the headstock, a spindle rotatably mounted in said headstock, a work holder on the end of said spindle, a rear tool holder on said bed carrying a tool adapted to cut off a portion of a work blank on said work holder, a chamfering tool holder mounted on said overarm carrying a tool operable on one end of the work blank, a second chamfering tool holder mounted on said headstock carrying a tool operable on the other end of the work blank, and means driven from the spindle for actuating said tool holders.

5. A machine comprising, in combination, means for supporting a plurality of work pieces, a rotatably supported work chucking means, means for ejecting finished work pieces from said work chucking means, means for operating said chucking and ejecting means, means for transferring work pieces from said supporting means to said work chucking means, a plurality of tools for finishing said work pieces, means for supporting and actuating said tools to finish a work piece, movably mounted means for receiving the finished work pieces having an opening through which the pieces are admitted, means for moving said receiving means from a position wherein said opening is on top so as to admit a work piece ejected from said work chucking means to a position wherein said opening is below, so as to prevent chips from falling therethrough, and means for controlling the operation of said work transferring, chucking, ejecting, and receiving means.

6. A machine comprising, in combination, means for supporting a plurality of work pieces, a rotatably supported work chucking means, means for ejecting finished work pieces from said work chucking means, means for transferring work pieces from said supporting means to said work chucking means, means for finishing said work pieces, movably mounted means for receiving the finished work pieces, means for moving said receiving means from a position wherein a work piece ejected from said work chucking means will fall therein to a position wherein chips cannot fall therein, and means for controlling the operation of said work transferring, chucking, ejecting, and receiving means.

7. In a machine tool, in combination, rotatably mounted work holding means, means for supporting work pieces, and means for transferring a work piece from said supporting means to said work holding means, said transferring means comprising a cylinder, a piston in said cylinder, a piston rod extending through one end of the cylinder, and a carrier supported on the outer end of said rod comprising a pair of longitudinally extending pins adapted to slide under and support a work piece during said transferring movement.

8. In a machine tool, in combination, means for rotatably supporting a work piece, means for supporting a tool for movement relatively to said work piece, and means for actuating said tool supporting means comprising a cam having a plurality of dwell portions intermediate inclined portions so as to feed the tool intermittently and thereby permit the tool to clear the cut periodically during the cutting operation.

9. In a machine tool, in combination, a rotatably mounted support, a second support slidably mounted for movement relatively to said rotatably mounted support, one of said supports being adapted to support a work piece and the other a tool, means for actuating said slidably mounted support comprising a cam having a plurality of dwell portions intermediate rise portions so as to feed said support intermittently and thereby permit the tool to clear the cut periodically during a cutting operation.

10. In a lathe, in combination, a rotatably mounted work supporting spindle, a slidably mounted tool support, means for rotating said spindle, and means for feeding said tool support intermittently in one direction so that the tool periodically dwells and clears the cut.

11. A lathe, in combination, a rotatably mounted work holder, a movably mounted tool support, means for actuating said work holder and tool support, and means for receiving finished work pieces comprising a tubular member rotatably mounted on an inclined axis, said member having an end wall at its upper end and an opening in its side adjacent said wall, means for oscillating said tubular member through 180 degrees to move said opening from an upper position wherein it is adjacent said work holder and is adapted to receive a finished work piece to a lower position to prevent chips from falling into said opening, said means comprising a piston and cylinder device, an annular gear secured to said tubular member, and a rack engaging said gear and connected to said piston.

12. A lathe having, in combination, a rotatably mounted work holder, a movably mounted tool support, means for actuating said work holder and tool support, and means for receiving finished work pieces comprising a receiver rotatably mounted, said receiver having an opening in one side for admitting work pieces, and means for rotating said receiver to move said opening from an upper position wherein it is positioned adjacent said work holder and adapted to receive a finished work piece to another position wherein chips cannot fall into said opening.

13. In a machine having a rotatably mounted support and a reciprocatory support, one of which is adapted to support the work and the other a tool, means for actuating said supports and means for receiving finished work pieces comprising a tubular member mounted on an inclined axis, said member having an opening in one side, means for moving said tubular member to move said opening from a position wherein it is adapted to receive a finished work piece to another position wherein chips cannot fall into said opening.

14. In a machine tool, in combination, a supply chute for work pieces having an opening at its upper end for receiving said pieces, a pin normally extending through a side wall of said chute adjacent said opening, and means for slidably supporting said pin and yieldingly holding it in its normal position, said pin being depressed by a work piece inserted in said chute only when the work piece is inserted in its proper position.

15. In a machine tool, in combination, a supply chute for work pieces having an opening at its upper end for receiving said pieces, and yieldable means mounted on said chute adjacent said opening operable to permit work pieces to be inserted when properly positioned and to prevent improperly positioned work pieces from being inserted.

16. A machine tool having, in combination, a rotatably mounted spindle, a work holder mounted at one end of said spindle and comprising a plurality of jaws, means movable longitudinally of the spindle for actuating said jaws including a piston carried on the spindle operable to actuate said jaws to clamp a work piece on said work holder, and a member slidably mounted on said spindle for movement longitudinally thereof for ejecting a finished work piece from said holder and operable by said piston when the piston moves in the opposite direction.

17. A machine comprising, in combination, a chute for supporting a plurality of work pieces, an abutment for the lowermost work piece, a rotatably supported work holding means comprising a plurality of movable jaws, reciprocatory means for transferring the lowermost work piece from said chute to said work holding means, means operable by the transferring means when moving in one direction to place a work piece on the work holding means and to actuate said jaws to clamp the work piece on said work holding means, and means for maintaining said jaws in clamping engagement with the work when the transferring means moves in the opposite direction.

18. A machine comprising, in combination, a chute for supporting a plurality of work pieces, an abutment for the lowermost work piece, a rotatably supported work holding means comprising a plurality of movable jaws, means for transferring the lowermost work piece from said chute to said work holding means, and means operable by the transferring means for actuating said jaws to clamp a work piece on said work holding means.

19. In an automatic lathe, in combination, a rotatably mounted work holder, a movably mounted tool support, means for actuating said work holder and tool support, means slidable longitudinally on said work holder operable to eject finished work pieces therefrom, a movably mounted receiver positioned beneath said work holder and movable from a position wherein work pieces ejected from said work holder by said ejecting means will fall into the receiver, to a position wherein chips from the work piece cannot fall into the receiver, and means operable in timed relation to the tool support and ejecting means for moving said receiver.

20. In an automatic lathe, in combination, a rotatably mounted work holder, a movably mounted tool support, means for actuating said work holder and tool support, means operable to eject finished work pieces from said work holder, a movably mounted receiver for finished work pieces movable from a position wherein all pieces ejected from said work holder by said ejecting means will fall into the receiver to a position wherein chips from the work piece during the cutting operation cannot fall into the receiver, and means operable in timed relation to the tool support for moving said receiver.

LEO A. DUMSER.
CLEMENT J. SCHROEDER.